(12) United States Patent
Kolesnikov et al.

(10) Patent No.: US 9,374,222 B2
(45) Date of Patent: Jun. 21, 2016

(54) SECURE COMMUNICATION OF DATA BETWEEN DEVICES

(71) Applicant: Alcatel-Lucent USA Inc., Murray Hill, NJ (US)

(72) Inventors: Vladimir Kolesnikov, Millburn, NJ (US); Howard Huang, New York, NY (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/475,014

(22) Filed: Sep. 2, 2014

(65) Prior Publication Data

US 2016/0065372 A1    Mar. 3, 2016

(51) Int. Cl.
| | |
|---|---|
| G06F 21/00 | (2013.01) |
| H04L 29/06 | (2006.01) |
| H04L 9/32 | (2006.01) |
| H04L 9/14 | (2006.01) |
| H04L 9/08 | (2006.01) |

(52) U.S. Cl.
CPC ............ *H04L 9/3226* (2013.01); *H04L 9/0894* (2013.01); *H04L 9/14* (2013.01)

(58) Field of Classification Search
CPC ........ H04L 9/3226; H04L 9/14; H04L 9/0894
See application file for complete search history.

(56) References Cited

U.S. PATENT DOCUMENTS

| | | | | |
|---|---|---|---|---|
| 2006/0288209 | A1* | 12/2006 | Vogler .................. | H04L 9/0844 713/168 |
| 2007/0143612 | A1* | 6/2007 | Brown ..................... | H04L 9/083 713/171 |
| 2009/0150596 | A1* | 6/2009 | Cheng .................. | G06F 12/0646 711/103 |
| 2014/0122885 | A1* | 5/2014 | Wu ......................... | H04L 29/06 713/171 |
| 2015/0142670 | A1* | 5/2015 | Zloth .................. | G06Q 20/3829 705/71 |
| 2015/0154038 | A1* | 6/2015 | Ahmed .................. | G06F 9/455 703/23 |
| 2015/0178769 | A1* | 6/2015 | Mirisola ............. | H04L 63/0421 705/14.45 |

* cited by examiner

*Primary Examiner* — Lisa Lewis

(74) *Attorney, Agent, or Firm* — Tong, Rea, Bentley & Kim, LLC

(57) ABSTRACT

A capability for secure communication of data from a source device to a destination device is presented. The source device has a device identifier associated therewith. The source device stores an encrypted version of the device identifier that is encrypted based on a master key of the destination device. The source device stores an encryption key. The source device communicates data to the destination device in a secure manner by encrypting the data using the encryption key and propagating the encrypted version of the device identifier and the encrypted data to the destination device. The destination device recovers the data sent by the source device by decrypting the encrypted version of the device identifier based on the master key to determine the device identifier, determining a decryption key based on the device identifier, and decrypting the encrypted data based on the decryption key to recover the data sent by the source device.

22 Claims, 3 Drawing Sheets

SECURE COMMUNICATION OF DATA BETWEEN DEVICES

TECHNICAL FIELD

The disclosure relates generally to communication networks and, more specifically but not exclusively, to secure communication of data from a source device to a destination device via a communication network.

BACKGROUND

In many cases, cryptography is used to secure communication of data from a source device to a destination device. However, there are various disadvantages associated with many existing cryptography techniques.

SUMMARY OF EMBODIMENTS

Various deficiencies in the prior art may be addressed by embodiments for secure communication of data between devices.

In at least some embodiments, a first device is configured to securely communicate data to a second device. The first device includes a processor and a memory communicatively connected to the processor. The processor is configured to determine an encrypted version of a device identifier of the first device, where the encrypted version of the device identifier is encrypted based on a master key of the second device. The processor is configured to encrypt the data, using an encryption key, to form encrypted data. The processor is configured to propagate, from the first device toward the second device, the encrypted version of the device identifier and the encrypted data.

In at least some embodiments, a method is provided for enabling a first device to securely communicate data to a second device. The method includes determining an encrypted version of a device identifier of the first device, where the encrypted version of the device identifier is encrypted based on a master key of the second device. The method includes encrypting the data, using an encryption key, to form encrypted data. The method includes propagating, from the first device toward the second device, the encrypted version of the device identifier and the encrypted data.

In at least some embodiments, a first device is configured to securely receive data from a second device. The first device includes a processor and a memory communicatively connected to the processor. The processor is configured to receive, from the second device, an encrypted version of a device identifier of the second device and encrypted data. The processor is configured to decrypt the encrypted version of the device identifier of the second device, based on a master key of the first device, to recover the device identifier of the second device. The processor is configured to decrypt the encrypted data, using a decryption key determined based on the device identifier of the second device, to recover data sent by the second device.

In at least some embodiments, a method is provided for enabling a first device to securely receive data from a second device. The method includes receiving, from the second device, an encrypted version of a device identifier of the second device and encrypted data. The method includes decrypting the encrypted version of the device identifier of the second device, based on a master key of the first device, to recover the device identifier of the second device. The method includes decrypting the encrypted data, using a decryption key determined based on the device identifier of the second device, to recover data sent by the second device.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements common to the figures.

DETAILED DESCRIPTION OF EMBODIMENTS

In general, a capability for secure data communication is presented. A source device and a destination device are configured to support secure communication of data from the source device to the destination device. The source device has a device identifier associated therewith. The source device stores an encrypted version of the device identifier that is encrypted based on a master key of the destination device. The source device stores an encryption key. The source device communicates data to the destination device in a secure manner by encrypting the data using the encryption key to form encrypted data and propagating the encrypted version of the device identifier and the encrypted data to the destination device. The destination device stores the master key of the destination device. The destination device has access to a decryption key that is generated based on the device identifier of the source device and the master key of the destination device. The destination device recovers the data sent by the source device by decrypting the encrypted version of the device identifier received from the source device based on the master key of the destination device to determine the device identifier of the source device, determining the decryption key based on the device identifier of the source device, and decrypting the encrypted data received from the source device based on the decryption key to recover the data sent by the source device. These and various other embodiments and advantages of the capability for secure data communication may be better understood when considered within the context of an exemplary communication system configured to support secure data communication between a source device and a destination device, as depicted in FIG. 1.

Figure 1:
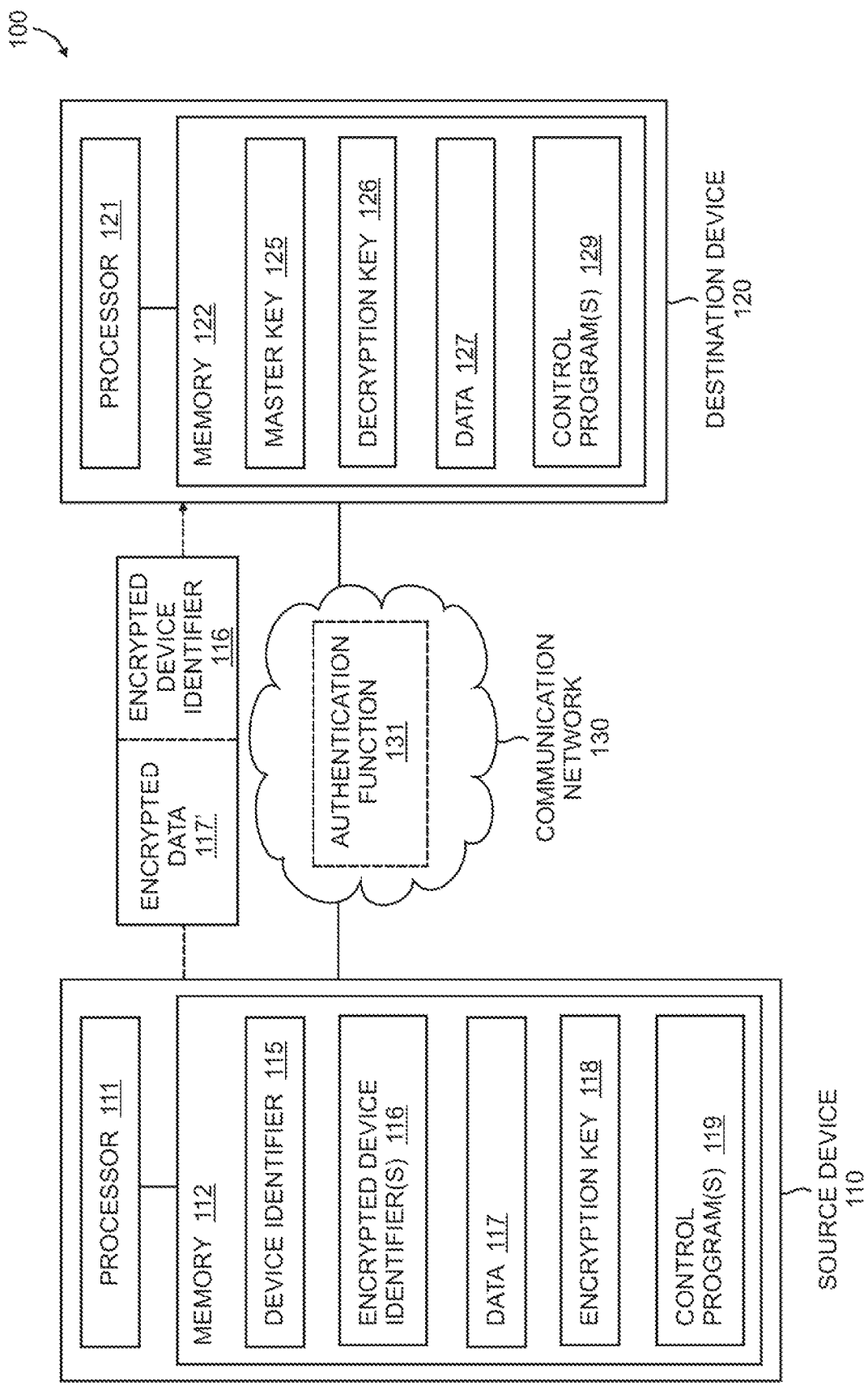
FIG. 1 depicts an exemplary communication system configured to support secure communication of data from a source device to a destination device.

FIG. 1 depicts an exemplary communication system configured to support secure communication of data from a source device to a destination device.

The communication system 100 includes a source device 110 and a destination device 120 configured to communicate via a communication network 130. The source device 110 may be a connected end device (e.g., a smart device, an Internet of Things (IoT) device, or the like), an end user device (e.g., a smartphone, a tablet computer, a laptop computer, or the like), a network element (e.g., a server, a switch, a virtual machine (VM), or the like), or any other suitable device. Similarly, the destination device 120 may be a connected end device, an end user device, a network element, or any other suitable device. The communication network 130 may include any suitable network(s) via which source device 110 and destination device 120 may communicate (e.g., a wireless access network, a cable access network, a transport network, a core network, an enterprise network, a datacenter network, or the like, as well as various combinations thereof).

The source device 110 is configured to securely communicate data to the destination device 120. The source device 110 includes a processor 111 and a memory 112 that is communicatively connected to processor 111. The memory 112 may be any suitable type of storage element (e.g., read only memory (ROM) or other suitable type of storage element). The memory 112 stores a device identifier 115 of the source device 110, a set of encrypted device identifiers $116_1$-$116_N$ (collectively, encrypted device identifiers 116), data 117 that is to be communicated to destination device 120, an encryption key 118, and a control program 119 which may be executed by processor 111 to provide various functions of source device 110 presented herein. The encrypted device identifiers 116, which are encrypted versions of the device identifier 115, are encrypted based on a master key of the destination device 120 (discussed further below). The encrypted device identifiers 116 may be pre-installed on source device 110 (e.g., during manufacturing or before the device is sold to the end user), downloaded onto source device 110 (e.g., at the time of activation of source device 110 or thereafter as needed or desired), or the like, as well as various combinations thereof. The encrypted device identifiers 116 may be generated by destination device 120 and provided from destination device 120 to source device 110. The encrypted device identifiers 116 may include N distinct sequences of K bits (e.g., where a message or portion of message to be used by source device 110 to provide encrypted device identifiers 116 to destination device 120 supports transport of K bits). The storage of the encrypted device identifiers 116 on the source device 110 obviates the need to store the master key of the destination device 120 on the source device 110, thereby protecting the master key of the destination device 120. The data 117 may be any suitable type of data which may be communicated between devices (e.g., a reading, a measurement, user-generated content, or any other suitable type of data which may be communicated from source device 110 to destination device 120 which, it will be appreciated, may depend on a device type of source device 110 or other factors). The encryption key 118 is used by source device 110 to encrypt the data 117 to be sent to the destination device 120. The encryption key 118 may be a random key which may be used to encrypt the data 117. The encryption key 118 may be generated based on one or more values of one or more parameters. The encryption key 118 may be generated based on the device identifier 115 and a secret key (e.g., the master key of the destination device 120 or any other suitable secret key). The encryption key 118 may be generated as a function of the device identifier 115 (e.g., the device identifier 115, information that is generated using the device identifier 115 as an input, or the like) and the secret key. The encryption key 118 may be generated based on fewer or more, as well as other, parameters (e.g., a time period identifier or any other suitable parameter(s) as would be understood by one skilled in the art). The encryption key 118 may be generated or determined by destination device 120 (e.g., based on the device identifier 115 and the master key of the destination device 120, as discussed above) and provided from destination device 120 to source device 110. The generation of the encryption key 118 by an element other than source device 110 obviates the need to store the secret key that is used for generation of the encryption key (e.g., master key of the destination device 120) on the source device 110, thereby protecting the secret key that is used for generation of the encryption key. The control program 119 may be executed by processor 111 in order to communicate data 117 to destination device 120 in a secure manner. The source device 110 may communicate data 117 to destination device 120 in a secure manner by (1) encrypting data 117, using the encryption key 118, to form encrypted data 117' and (2) propagating, toward the destination device 120, one of the encrypted device identifiers 116 and the encrypted data 117'. The source device 110 may be configured to encrypt the data 117 to form encrypted data 117' using probabilistic authenticated symmetric encryption. The encryption process used by the source device 110 to encrypt the data 117 to form encrypted data 117' may be designed to have a significantly (e.g., several orders of magnitude) lower complexity than convention public key encryption (e.g., RSA or other similar public key encryption techniques). The source device 110 may be configured to select the one of the encrypted device identifiers 116 that is propagated to the destination device 120 with the encrypted data 117' randomly, by selecting a next one of the encrypted device identifiers 116 where source device 110 is configured to use the encrypted device identifiers 116 in a round robin manner, or the like. The source device 110 may be configured to propagate the one of the encrypted device identifiers 116 and the encrypted data 117' toward the destination device 120 as a single message (e.g., a message including two fields where a first field includes the one of the encrypted device identifiers 116 and a second field includes the encrypted data 117'), as two messages (e.g., a first message including the one of the encrypted device identifiers 116 and a second message including the encrypted data 117'), or the like. It is noted that source device 110 may be configured to perform various other functions in support of secure communication of data from the source device 110 to the destination device 120.

The destination device 120 includes a processor 121 and a memory 122 that is communicatively connected to processor 121. The memory 122 may be any suitable type of storage element (e.g., ROM or other suitable type of storage element). The memory 122 stores a master key 125, a decryption key 126, data 127, and a control program 129 which may be executed by processor 121 to provide various functions of destination device 120 presented herein. The master key 125, as discussed above, is used to generate the encrypted device identifiers 116 stored on source device 110 for use in securely communicating data 117 to destination device 120. It will be appreciated that, although primarily depicted and described with respect to use of a single master key (illustratively, master key 125), destination device 120 may have multiple master keys associated therewith (e.g., for use in generating encrypted device identifiers 116 for different source devices or different groups of source devices, for use in generating encryption keys 118 for different source devices or different groups of source devices, or the like, as well as various combinations thereof). The decryption key 126 is associated with the source device 110 and is used by destination device 120 to decrypt the encrypted data 117' received from the source device 110. The decryption key 126 may be a random key which may be used to decrypt the encrypted data 117' to recover the data 117 that was encrypted based on encryption key 118. The decryption key 126 may be generated based on one or more values of one or more parameters. The decryption key 126 may be generated based on the device identifier 115 of source device 110 and a secret key (e.g., the master key 125 or any other suitable secret key). The decryption key 126 may be generated as a function of the device identifier 115 of the source device 110 (e.g., the device identifier 115, information that is generated using the device identifier 115 as an input, or the like). The decryption key 126 may be generated based on fewer or more, as well as other, parameters (e.g., a time period identifier or any other suitable parameter(s) as would be understood by one skilled in the art). The decryption key 126 may be generated by destination device 120 or generated by an element and provided from the element to destination device 120. The decryption key 126 may be generated in advance of receipt of the encrypted data 117' from the source device 110 and stored on destination device 120 for later use by destination device 120 in decrypting encrypted data 117' received from source device 110. The decryption key 126 may be generated responsive to receipt of the encrypted data 117' from the source device 110. The data 127 stored by destination device 120 may include the data 117 from source device 110 (e.g., stored by destination device 120 following decryption of the encrypted data 117' by destination device 120), data generated by destination device 120 based on the data 117 from source device 110, or the like, as well as various combinations thereof. The control program 129 may be executed by processor 121 in order to recover data 117 communicated from source device 110 to destination device 120 in a secure manner. The destination device 120 recovers the data 117 sent by source device 110 in a secure manner by (1) decrypting the encrypted device identifier 116 received from the source device 110, based on the master key 125 of the destination device 120, to determine the device identifier 115 of the source device 110 and (2) decrypting the encrypted data 117' received from the source device 110, based on the decryption key 126, to recover the data 117. The destination device 120 may be configured to determine the decryption key 126 for use in decrypting encrypted data 117' by generating the decryption key 126 as a function of the device identifier 115 of source device 110 that is recovered by decrypting the one of the encrypted device identifiers 116 received from the source device 110, retrieving the decryption key 126 based on the device identifier 115 of the source device 110 (e.g., where the decryption key 126 stored by destination device 120 may be maintained as a mapping of the device identifier 115 of the source device 110 to the decryption key 126 such that the device identifier 115 of source device 110 that is recovered by decrypting the one of the encrypted device identifiers 116 received from the source device 110 may be used to retrieve the decryption key 126), or the like. The destination device 120, as noted above, also may be configured to generate the encrypted device identifiers 116 for source device 110 (e.g., encrypted based on the master key 125 of destination device 120) and propagate the encrypted device identifiers 116 to the source device 110 (e.g., periodically, responsive to a trigger condition (e.g., detection that an eavesdropper is attempting to snoop communications from the source device 110, detection of a security event associated with one or more other devices that communicate data to the destination device 120, or other event), or the like, as well as various combinations thereof) for use by the source device 110 in sending the data 117 to destination device 120 securely. The destination device 120, as noted above, also may be configured to generate the encryption key 118 for the source device 110 (e.g., based on the device identifier of the source device 110 and the master key 126 of the destination device 120) and propagate the encryption key 118 to the source device 110 for use by the source device 110 in sending the data 117 to destination device 120 securely. It is noted that destination device 120 may be configured to perform various other functions in support of secure communication of data from the source device 110 to the destination device 120.

The communication system 100 may be configured to support additional security measures which may be applied in conjunction with securing of communications from source device 110 to destination device 120.

It at least some embodiments, source device 110 and destination device 120 may be configured to support use of verification information to verify the communication of the data 117 from the source device 110 to the destination device 120 before destination device 120 processes the data 117. The verification information may include a timestamp(s), a parity check bit or other parity check information, or the like, as well as various combinations thereof. The source device 110 may be configured to include the verification information as part of the data 117 (e.g., such that the verification information also is encrypted for transmission to destination device 120), within a message(s) that is used to transport the data 117 (e.g., such that the verification information is not encrypted for transmission to destination device 120), or the like, as well as various combinations thereof. The destination device 120 may be configured to use the verification information to verify that the communication of the data 117 from the source device 110 to the destination device 120 is valid before destination device 120 processes the data 117.

It at least some embodiments, a communication authentication function may be deployed along the communication path from the source device 110 to the destination device 120. This is depicted as authentication function 131 associated with the communication network 130. The authentication or validation of a data transmission by the source device 110 may be provided by configuring the source device 110 to include authentication information with the data transmission and configuring the authentication function 131 to determine whether the data transmission received by the authentication function 131 includes the authentication information. The authentication information could be a fixed sequence of bits or any other suitable information which may be used by the authentication function 131 to determine whether a data transmission received at the authentication function 131 is valid. The authentication information may be provided in a third field of a message including encrypted data (e.g., where the other two fields include the encrypted device identifier 116 and the encrypted data 117' as discussed above). The authentication function 131, upon determining that a data transmission from source device 110 includes the expected authentication information, may forward the data transmission toward the destination device 120. The authentication function 131, upon determining that a data transmission from source device 110 does not include the expected authentication information, may prevent forwarding of the data transmission toward the destination device 120 and may appropriately handle the data transmission (e.g., drop the data transmission, quarantine the data transmission for further analysis, or the like). As noted above, the authentication function 131 could be applied at various locations along the communication path from the source device 110 to the destination device 120. It is noted that application of the authentication function 131 at a point of access to the communication network 130 for the source device 110 may prevent unauthorized transmissions (and, thus, unauthorized data) from entering the communication network 130. For example, this may prevent a denial of service attack from a malicious user or other types of attacks which may be initiated. It is noted that application of the authentication function 131 at a point of access to the communication network 130 for the source device 110 may be particularly useful where the source device 110 communicates with the gateway device 131 in a connectionless manner, such that there is little or no authentication of the source device 110 prior to transmissions by the source device 110.

It will be appreciated that communication system 100 may be configured to support various other security measures which may be applied in conjunction with securing of communications from source device 110 to destination device 120.

Figure 2:
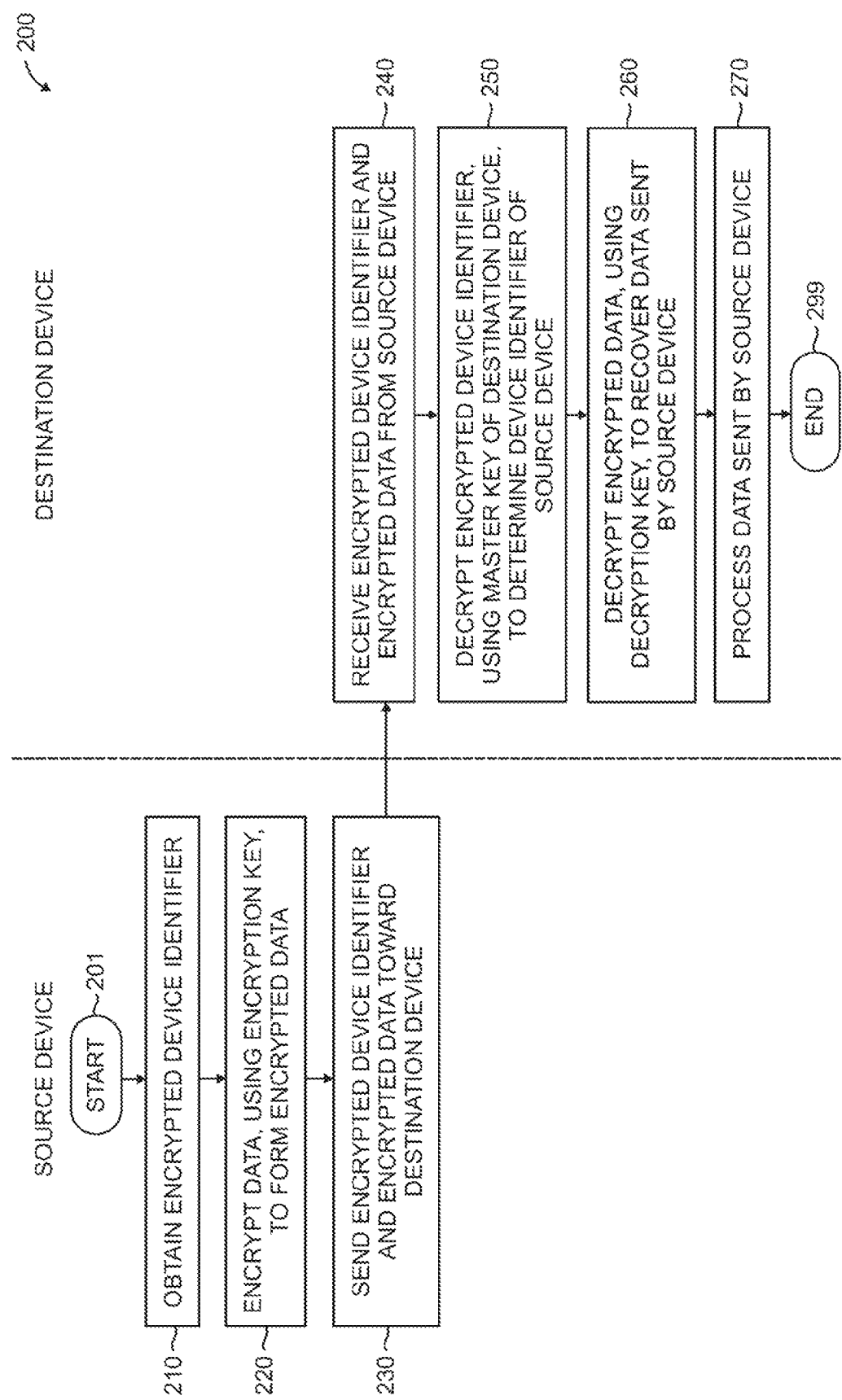
FIG. 2 depicts an exemplary embodiment of a method for supporting secure communication of data from a source device to a destination device.

FIG. 2 depicts an exemplary embodiment of a method for supporting secure communication of data from a source device to a destination device. As depicted in FIG. 2, a portion of the steps of method 200 are performed by the source device and a portion of the steps of method 200 are performed by the destination device (e.g., source device 110 and destination device 120 depicted and described with respect to FIG. 1). The source device has a device identifier associated therewith. The destination device stores a master key. At step 201, method 200 begins. At step 210, the source device obtains an encrypted device identifier. The encrypted device identifier was previously encrypted using the master key of the destination device as a key. The source device may retrieve the encrypted device identifier from a memory of the source device. The source device may select the encrypted device identifier from among a set of multiple encrypted device identifiers stored on the source device. At step 220, the source device encrypts the data, using an encryption key, to form encrypted data. The encryption key may be a function of the device identifier of the source device and a secret key (e.g., the master key of the destination device), or of any other suitable parameter or set of parameters. At step 230, the source device sends the encrypted device identifier and the encrypted data toward the destination device. At step 240, the destination device receives the encrypted device identifier and the encrypted data from the source device. At step 250, the destination device decrypts the encrypted device identifier, using the master key of the destination device as a key, to determine the device identifier of the source device. At step 260, the destination device decrypts the encrypted data, using a decryption key determined based on the device identifier of the source device, to recover the data sent by the source device. The destination device may determine the decryption key based on the device identifier of the source device by generating the decryption key as a function of the device identifier of the source device (e.g., based on the device identifier recovered from decryption of the encrypted device identifier), retrieving the decryption key from a memory of the destination device based on the device identifier of the source device (e.g., where the decryption key is generated by the destination device in advance and stored on the destination device), or the like. At step 270, the destination device processes the data sent by the source device (e.g., stores the data, generates a response for the source device based on the data, or the like, as well as various combinations thereof). At step 299, method 200 ends. It will be appreciated that the various steps of method 200 may be better understood when read in conjunction with FIG. 1.

Various embodiments of the capability for secure communication of data provide various advantages. Various embodiments of the capability for secure communication of data prevent communications by the source device to the destination device from being traced by malicious entities (or at least makes tracing of communications by the source device to the destination device significantly more difficult for malicious entities). Various embodiments of the capability for secure communication of data, by enabling the source device to use multiple encrypted device identifiers in communications by the source device, may make linking of the communications by the source device (e.g., linking of the communications as being from the same device) difficult. For example, while a persistent eavesdropper in the vicinity of the source device, upon learning all of the encrypted device identifiers of the source device, would be able to link any future transmissions to the source device regardless of the data communicated by the source device, if the number of encrypted device identifiers of the source device is relatively large (e.g., 80K, 100K, 120K, or the like) and the transmissions by the source device occur relatively infrequently (e.g., once per second, less than once per second, once per minute, or the like), the effort required by the eavesdropper would be quite significant. Various embodiments of the capability for secure communication of data make communications by the device to the server non-interactive (e.g., without requiring the device to receive any messages from any entities, including the server). It is contemplated that various embodiments of the capability for secure communication of data may provide various other advantages.

Various embodiments of the capability for secure communication of data may be particularly well-suited for supporting secure communication of data from various smart devices to servers configured to handle data from smart devices (e.g., sending a measurement from a sensor to an IoT server, sending an indicator from a detector to a network server, or the like). Various embodiments of the capability for secure communication of data are relatively lightweight in terms of power, processing, and memory requirements on the source device, which may be particularly useful where the source devices are smart devices, many of which are limited in terms of power, processing, and memory capabilities. Various embodiments of the capability for secure communication of data obviate the need for storage of important information (e.g., the master key of the destination device) on the source device (rather, only relatively low importance data, such as the data produced by the source device for transmission to the destination device), which may be particular important where the source devices are smart devices which may be deployed in unsecured or adversarial environments in which the smart devices may be subjected to key extraction attacks. Various embodiments of the capability for secure communication of data obviate the need to support key management as typically required in conventional symmetric-key cryptography, which is advantageous as supporting key management in an environment expected to support a huge number of smart devices may be difficult at best, or even unfeasible. Various embodiments of the capability for secure communication of data obviate the need for smart devices to support conventional asymmetric-key cryptography, which is at least advantageous, and possibly necessary, as the complexity of the associated encryption procedure is expected to be too computationally expensive to many smart devices to implement. It is contemplated that various embodiments of the capability for secure communication of data may provide other advantages where the source device is a smart device (or other similar device) and the destination device is a server (or other similar device).

It will be appreciated that, although primarily depicted and described herein with respect to securing communications from a source device to a destination device, references herein to the source device and the destination device may be read more generally as references to devices without having associated designations related to whether the devices are the sources or the destinations of data being communicated. For example, the source of the data may be referred to as a first device and the destination of the data may be referred to as a second device, or vice versa.

Figure 3:
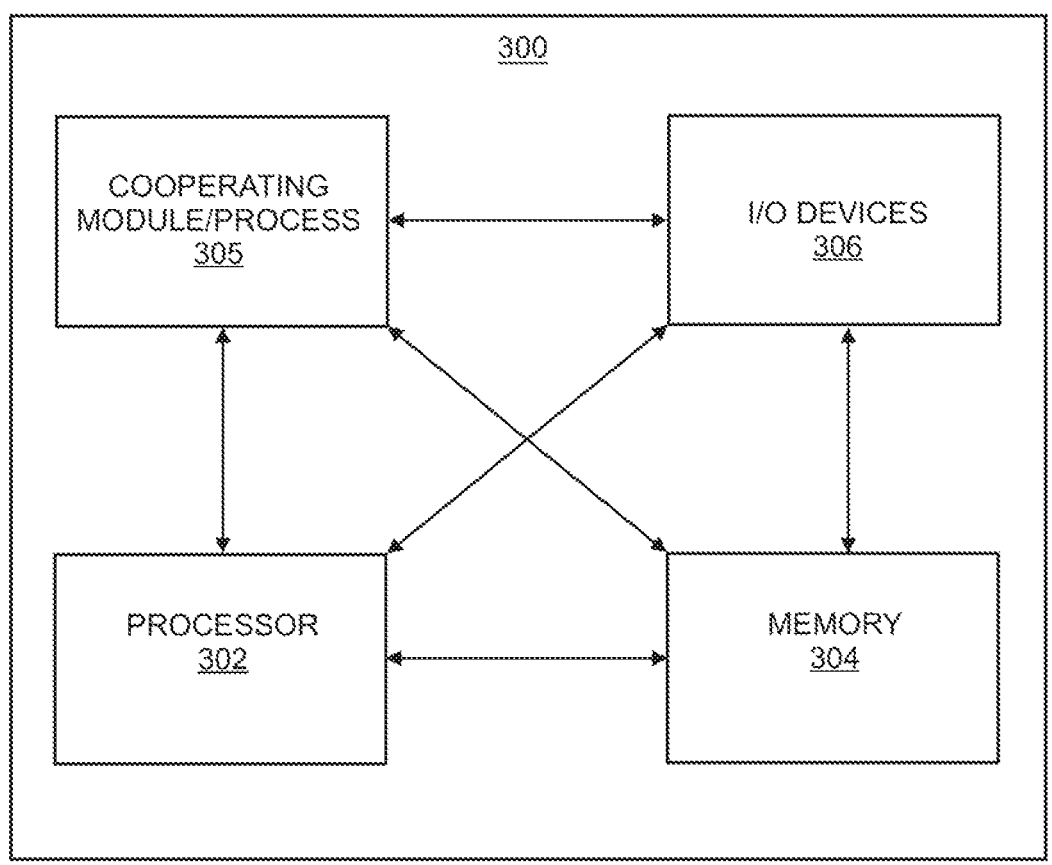
FIG. 3 depicts a high-level block diagram of a computer suitable for use in performing functions described herein.

FIG. 3 depicts a high-level block diagram of a computer suitable for use in performing functions described herein.

The computer 300 includes a processor 302 (e.g., a central processing unit (CPU) and/or other suitable processor(s)) and a memory 304 (e.g., random access memory (RAM), read only memory (ROM), and the like).

The computer 300 also may include a cooperating module/process 305. The cooperating process 305 can be loaded into memory 304 and executed by the processor 302 to implement functions as discussed herein and, thus, cooperating process 305 (including associated data structures) can be stored on a computer readable storage medium, e.g., RAM memory, magnetic or optical drive or diskette, and the like.

The computer 300 also may include one or more input/output devices 306 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 300 depicted in FIG. 3 provides a general architecture and functionality suitable for implementing functional elements described herein and/or portions of functional elements described herein. For example, the computer 300 provides a general architecture and functionality suitable for implementing source device 110, destination device 120, one or more elements of the communication network 130, authentication function 131, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. A first device configured to securely communicate data to a second device, the first device comprising:
   a memory storing a set of instructions; and
   a processor communicatively connected to the memory, the processor configured to execute the set of instructions to cause the first device to:
      receive, at the first device from the second device, an encrypted version of a device identifier of the first device, wherein the encrypted version of the device identifier is encrypted based on a master key of the second device;
      store the encrypted version of the device identifier at the first device;
      encrypt the data, at the first device using an encryption key, to form encrypted data, wherein the encryption key is generated based on the device identifier of the first device and the master key of the second device; and
      propagate, from the first device toward the second device, the encrypted version of the device identifier and the encrypted data.

2. The first device of claim 1, wherein the processor is configured to:
   receive, at the first device from the second device, a set of multiple encrypted versions of the device identifier; and
   select the encrypted version of the device identifier from the set of multiple encrypted versions of the device identifier.

3. The first device of claim 1, wherein the processor is configured to:
   receive, at the first device from the second device, a set of multiple encrypted versions of the device identifier; and
   store the set of multiple encrypted versions of the device identifier at the first device.

4. The first device of claim 1, wherein the processor is configured to:
   receive the encryption key from the second device; and
   store the encryption key at the first device.

5. The first device of claim 1, wherein the processor is configured to propagate the encrypted version of the device identifier and the encrypted data toward the second device in a message, wherein the message comprises a first field including the encrypted version of the device identifier and a second field including the encrypted data.

6. A method for use by a first device to securely communicate data to a second device, the method comprising:
   using a processor and a memory for:
      receiving, at the first device from the second device, an encrypted version of a device identifier of the first device, wherein the encrypted version of the device identifier is encrypted based on a master key of the second device;
      storing the encrypted version of the device identifier at the first device;
      encrypting the data, at the first device using an encryption key, to form encrypted data, wherein the encryption key is generated based on the device identifier of the first device and the master key of the second device; and
      propagating, from the first device toward the second device, the encrypted version of the device identifier and the encrypted data.

7. The method of claim 6, further comprising:
   receiving, at the first device from the second device, a set of multiple encrypted versions of the device identifier; and
   selecting the encrypted version of the device identifier from the set of multiple encrypted versions of the device identifier.

8. The method of claim 6, further comprising:
   receiving, at the first device from the second device, a set of multiple encrypted versions of the device identifier; and
   storing the set of multiple encrypted versions of the device identifier at the first device.

9. The method of claim 6, further comprising:
receiving the encryption key from the second device; and
storing the encryption key at the first device.

10. The method of claim 6, wherein the encrypted version of the device identifier and the encrypted data are propagated toward the second device in a message, wherein the message comprises a first field including the encrypted version of the device identifier and a second field including the encrypted data.

11. A first device configured to securely receive data from a second device, the first device comprising:
a memory storing a set of instructions; and
a processor communicatively connected to the memory, the processor configured to execute the set of instructions to cause the first device to:
generate, at the first device, an encryption key for the second device based on a master key of the first device and a device identifier of the second device;
propagate, from the first device toward the second device, the encryption key for the second device;
receive, at the first device from the second device, an encrypted version of the device identifier of the second device and encrypted data;
decrypt the encrypted version of the device identifier of the second device, at the first device based on the master key of the first device, to recover the device identifier of the second device; and
decrypt the encrypted data, at the first device using a decryption key determined based on the device identifier of the second device, to recover data sent by the second device.

12. The first device of claim 11, wherein the processor is configured to receive the encrypted version of the device identifier and the encrypted data in a message, wherein the message comprises a first field including the encrypted version of the device identifier and a second field including the encrypted data.

13. The first device of claim 11, wherein the processor is configured to:
determine the decryption key based on the device identifier of the second device.

14. The first device of claim 13, wherein, to determine the decryption key based on the device identifier of the second device, the processor is configured to:
generate the decryption key based on the master key of the first device and the device identifier of the second device; or
retrieve the decryption key based on the device identifier of the second device.

15. The first device of claim 11, wherein the processor is configured to store the data sent by the second device or generate a response for the second device based on the data sent by the second device.

16. The first device of claim 11, wherein the processor is configured to:
generate a set of encrypted device identifiers for the second device based on the master key of the first device; and
propagate the set of encrypted device identifiers toward the second device.

17. A method for a first device to securely receive data from a second device, the method comprising:
using a processor and a memory for:
generating, at the first device, an encryption key for the second device based on a master key of the first device and a device identifier of the second device;
propagating, from the first device toward the second device, the encryption key for the second device;
receiving, at the first device from the second device, an encrypted version of the device identifier of the second device and encrypted data;
decrypting the encrypted version of the device identifier of the second device, at the first device based on the master key of the first device, to recover the device identifier of the second device; and
decrypting the encrypted data, at the first device using a decryption key determined based on the device identifier of the second device, to recover data sent by the second device.

18. The method of claim 17, wherein the encrypted version of the device identifier and the encrypted data are received in a message, wherein the message comprises a first field including the encrypted version of the device identifier and a second field including the encrypted data.

19. The method of claim 17, further comprising:
determining the decryption key based on the device identifier of the second device.

20. The method of claim 19, wherein determining the decryption key based on the device identifier of the second device comprises one of:
generating the decryption key based on the master key of the first device and the device identifier of the second device; or
retrieving the decryption key based on the device identifier of the second device.

21. The method of claim 17, further comprising at least one of:
storing the data sent by the second device; or
generating a response for the second device based on the data sent by the second device.

22. The method of claim 17, further comprising:
generating a set of encrypted device identifiers for the second device based on the master key of the first device; and
propagating the set of encrypted device identifiers toward the second device.

* * * * *